(No Model.)
2 Sheets—Sheet 1.
J. C. HARKER.
GRAIN AND HAY LOADER.
No. 306,150.
Patented Oct. 7, 1884.
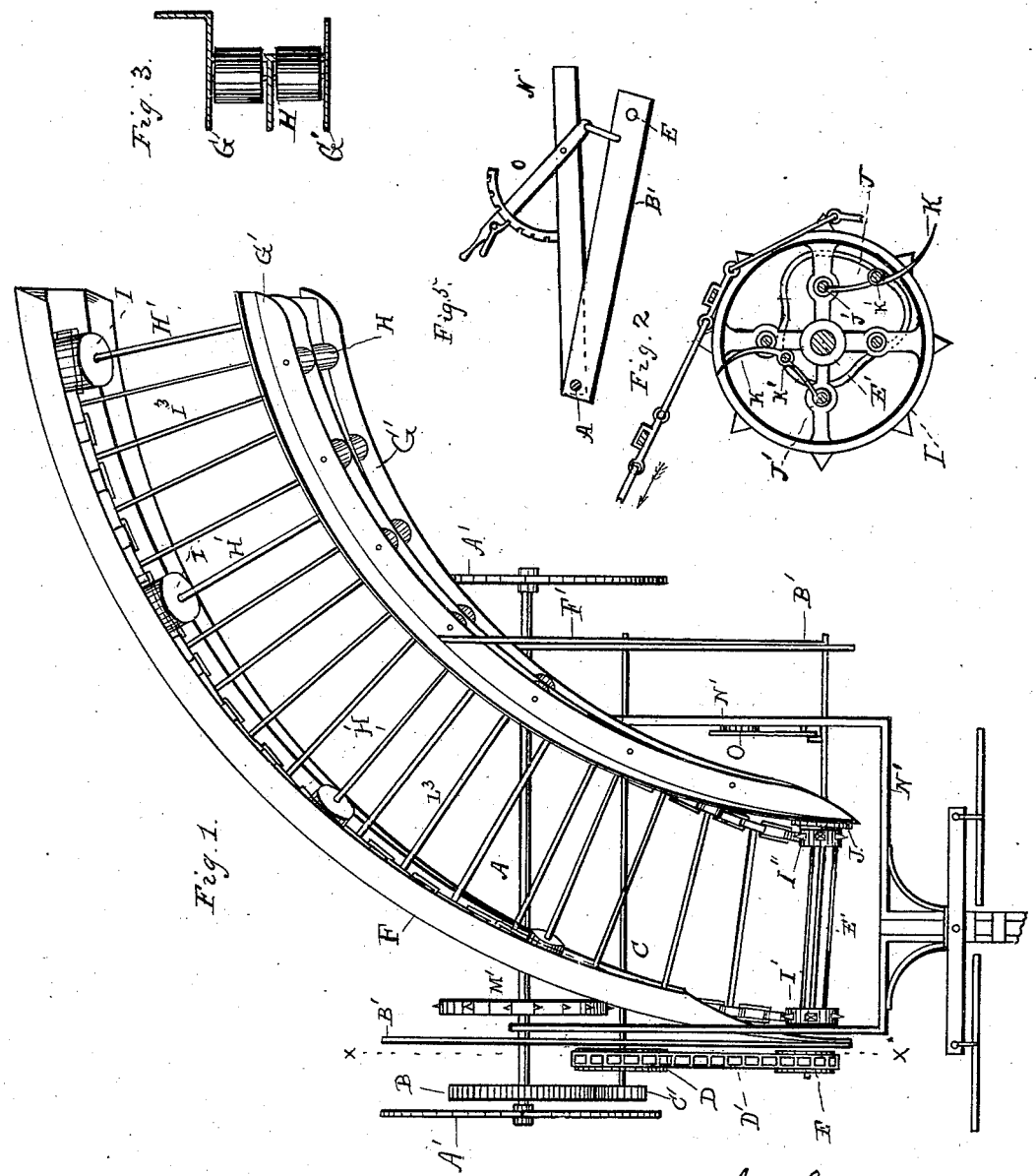

(No Model.)
J. C. HARKER.
GRAIN AND HAY LOADER.
No. 306,150. Patented Oct. 7, 1884.
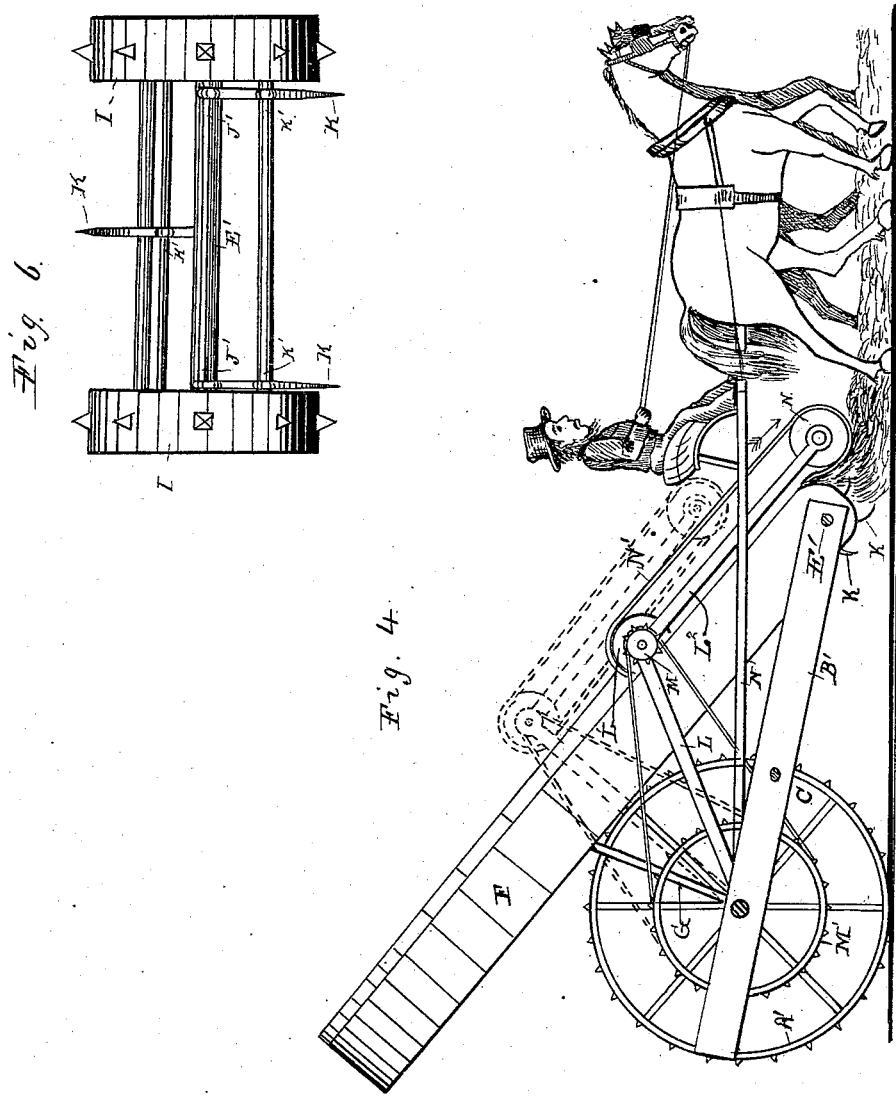
WITNESSES
INVENTOR
John C. Harker

UNITED STATES PATENT OFFICE.

JOHN C. HARKER, OF GRAND JUNCTION, IOWA.

GRAIN AND HAY LOADER.

SPECIFICATION forming part of Letters Patent No. 306,150, dated October 7, 1884.

Application filed April 5, 1883. (No model.)

*To all whom it may concern:*

Be it known that I, JOHN C. HARKER, a citizen of the United States, residing at Grand Junction, in the county of Greene and State of Iowa, have invented certain new and useful Improvements in Grain and Hay Loaders, of which the following is a specification, reference being had therein to the accompanying drawings.

This invention relates to certain new and useful improvements in grain or hay loaders, and it has special reference to that class which is adapted to gather the hay as it is drawn over the fields and to elevate and discharge the same into an attendant wagon.

It consists in providing a suitable truck or running-gear with an inclined curved elevating-frame carrying an endless chain provided with slats, which is operated by suitable pulleys and chains, which receive their motion from the axle of the truck.

In the accompanying drawings, Figure 1 represents a plan view of my improved hay-elevator with the supplemental apron and the gatherers removed; Fig. 2, a sectional view taken through the lower elevator-shaft, showing the hay forks or gatherers; Fig. 3, a cross-section of the inner side of the elevator-frame; Fig. 4, a vertical sectional view of the machine on the line *x x* of Fig. 1; Fig. 5, a side elevation of a portion of the hounds, showing the lever for regulating the distance of the gatherers from the ground, as also a portion of the frame; and Fig. 6, a front elevation of the gathering-fingers and their co-operating devices.

The letter A indicates the axle of my improved machine, which is supported by the wheels A', the same being of the ordinary or of any approved construction, and to this axle is secured the main driving gear-wheel B. To the said axle is also secured the side beams or bars, B', which constitute, principally, the truck-frame, and to the said bars is journaled the shaft C, which is provided at one end with a pinion, C', adapted to intermesh with the gear-wheel B, from which it receives a rotary motion.

Mounted upon the shaft C is a sprocket-wheel, D, over which is fitted a drive-chain, D', which also passes over the sprocket-wheel E, mounted on the lower elevator-shaft, E'. This shaft passes through the lower ends of the elevating-frame, and has its journal-bearings in the forward end of the truck-frame.

The letter F indicates a curved or segmental elevator-frame, constructed of any suitable material—preferably of sheet-iron—of suitable stiffness for the purpose. The said frame is mounted and secured upon the truck in any suitable manner—in the present instance by passing the lower elevator-shaft through the sides of its lower extremity and by the braces F' and G. This frame is provided on one side with plates G', which form journal-bearings for the spindles of the anti-friction rollers H, the function of which is to aid in the easy operation of the elevating-chains. These rollers protrude a short distance through slots formed in the vertical portion of said frame, whereby the chains come in contact therewith and they are made to revolve, thus effecting the more easy operation of the chain, as above mentioned. It is also provided with a series of transverse shafts, H', carrying near their respective ends the outer friction-rollers, I, over which the elevating-chains travel. The outer end of said shafts, or the one nearest the upper end of the elevator-frame, may be fitted within adjustable journals, for the purpose of taking up the slack or wear of the chains. These chains are constructed of a series of links connected together by an intermediate series of iron straps having their ends riveted together and bent so as to form slots, in which fit the ends of the slats I³, by which the hay or grain is elevated.

It will be observed from Fig. 3 of the drawings that the elevating-frame is provided with ways, upon which the lower section of the chains are adapted to travel, and by which they are supported.

To the shaft E' are secured sprocket-wheels I' and I'', by which the elevating-chains are given their motion, the one which operates the longer chain being of larger diameter and having a correspondingly greater number of sprockets.

To the lower ends of the elevator-frame are secured cams J.

To the spokes of the sprocket-wheels I' and

I″ are secured the transverse rods J′, upon which are pivoted a series of rake-fingers or gatherers, K. Intermediate the ends of said fingers are secured the transverse operating-rods K′, the said rods extending between the spokes of the wheels, and being adapted to engage a cam-shaped groove in the face of the cam, the operation of which will presently appear.

The letter L indicates a frame, preferably constructed of metal, secured loosely on the axle A, and adapted to rest upon the upper edge of the elevator-frame.

To the upper end of the frame L is journaled a roller, L′, the shaft of which is provided with a sprocket-wheel, M, over which passes a drive-chain adapted to receive motion from the sprocket-wheel M′, secured rigidly to the main axle.

L² are bars pivoted to the shaft of the roller L′, and in the lower part of said bars is journaled the roller N. Over these rollers L′ N is fitted an endless apron, N′, which receives its motion in the direction of the arrow. That portion of the apron N′ adjacent to the elevating-chains acts to aid in the initial elevation of the grain or straw and to prevent the same from gravitating or slipping back off the elevating-chains and slats.

Loosely secured to the main axle of the machine are the hounds N′, and to these hounds is attached a draft-pole or tongue. To one of the said hounds is pivoted a lever, O, the shorter arm of which connects with a link attached to the forward end of the truck-frame B′, and the longer arm of which is provided with a detent adapted to engage with a locking segment-plate. By this means the distance of the gatherers from the ground is regulated.

The operation of my invention will be readily understood when taken in connection with the above, and is in substance as follows: When the machine is drawn forward, the lower elevating-shaft is set in motion through the medium of the gear-wheel B and the sprocket-wheels and drive-chain hereinbefore mentioned. The rotation of the said shaft revolves the gatherers around its own axis, and at the same time by means of the transverse operating-rods and the cam-groove the said fingers are made to gather up the hay or straw and deposit it upon the elevator-slats beneath the apron N′. The frictional contact of the apron N′ with the hay assists in its initial elevation. The continued travel of the elevating-slats conveys the straw and hay to the end of the frame, whence it is deposited in the attendant wagon.

In using my invention it is obvious that when one wagon shall have received its load it can give place to another, which in turn may also give place to still another, and thus the continued and uninterrupted loading process may be carried on.

Having thus fully described my invention, what I claim as new, and desire to secure by Letters Patent, is—

1. The combination, in a hay-elevator, of the curved upwardly-inclined elevator-frame suitably mounted and provided with sprocket-wheels at its lower end of different diameters, the elevating-chains of different lengths operated, respectively, by the larger and smaller wheels, the transverse rods secured to said wheels, the gathering-fingers pivoted at one end, their operating-rods connected to the fingers intermediate the ends of the fingers, and the cams with which said operating-rods engage.

2. The combination, in a hay-elevator, of the curved inclined elevator-frame, the sprocket-wheels at its lower end of different diameters, and the elevating-chains of different lengths operated, respectively, by the larger and smaller wheels with the endless supplemental apron, the transverse rods secured to said wheels, the gathering-fingers pivoted at one end, the operating-rods connected to the fingers intermediate the ends of the fingers, and the cams with which said rods engage.

3. The combination, in a hay-elevator, of the lower elevator-shaft and its wheels with the transverse rods secured to said wheels, the gathering-fingers pivoted at one end, the operating-rods connected to the fingers intermediate the ends of the fingers, and the cams with which said operating-rods engage, whereby the fingers are made to pick up and deposit the hay upon the elevator-apron.

4. The combination, in a hay-elevator, of the curved elevator-frame, its sprocket-wheels, and the chains actuated thereby, with the supplemental endless apron pivotally connected with the supporting-axle, and adapted to act in conjunction with the chains in giving the hay its initial movement.

5. In a hay-elevator, the combination of the truck, the supporting-axle provided with a driving cog-wheel, the shaft geared therewith and having a sprocket-wheel, the lower elevating-shaft having a sprocket-wheel, the drive-chains, and the sprocket-wheels of different diameters, with the elevating-chains of different lengths, and the endless supplemental apron pivotally connected to the supporting-axle and adapted to act in conjunction with said elevating-chains.

In testimony whereof I affix my signature in presence of two witnesses.

JOHN C. HARKER.

Witnesses:
R. D. O. SMITH,
LEWIS K. ALDER.